United States Patent
Suliman et al.

(10) Patent No.: US 12,416,085 B1
(45) Date of Patent: Sep. 16, 2025

(54) NANOCOMPOSITE CATALYST FOR WATER SPLITTING

(71) Applicant: KING FAHD UNIVERSITY OF PETROLEUM AND MINERALS, Dhahran (SA)

(72) Inventors: Munzir Hamedelniel Mohamed Suliman, Dhahran (SA); Muhammad Usman, Dhahran (SA); Tahir Rasheed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/217,913

(22) Filed: May 23, 2025

(30) Foreign Application Priority Data

May 12, 2025 (SA) .................................. 1020253259

(51) Int. Cl.
  *C25B 1/04* (2021.01)
  *C25B 11/052* (2021.01)
  *C25B 11/095* (2021.01)

(52) U.S. Cl.
  CPC .............. *C25B 1/04* (2013.01); *C25B 11/052* (2021.01); *C25B 11/095* (2021.01)

(58) Field of Classification Search
  None
  See application file for complete search history.

(56) References Cited

U.S. PATENT DOCUMENTS

| | | | |
|---|---|---|---|
| 9,528,192 | B1* | 12/2016 | Chen .................... C25B 3/25 |
| 12,126,029 | B2* | 10/2024 | Lee .................... H01M 4/8817 |

(Continued)

FOREIGN PATENT DOCUMENTS

| | | |
|---|---|---|
| CN | 111146015 B | 1/2022 |
| CN | 113151841 B | 3/2022 |

(Continued)

OTHER PUBLICATIONS

Yuxuan Wang, et al., "Nitrogen-doped carbon layer coated Co(OH)F/CoP2 nanosheets for high-current hydrogen evolution reaction in alkaline freshwater and seawater", Dalton Trans., vol. 53, Issue 37, Sep. 5, 2024, pp. 15509-15516.

(Continued)

*Primary Examiner* — John J Figueroa
(74) *Attorney, Agent, or Firm* — Oblon, McClelland, Maier &Neustadt, L.L.P.

(57) ABSTRACT

A nanocomposite catalyst for use as an electrode in water electrolysis includes a cobalt triazole (Co-Tri) metal-organic framework (MOF), carbon quantum dots (CQDs), carbon nanosheets (CNs), and an ionically conductive polymer binder. The mass ratio of the nanocomposite catalyst includes cobalt triazole metal-organic framework to the carbon quantum dots is in the range of 1:2 to 1:4, and the mass ratio of the cobalt triazole metal organic framework to the carbon nanosheets mass ratio is in the range of 1:4 to 1:6. The nanocomposite catalyst includes current density less than or equal to ($\leq$) –5 milliampere per centimeter square ($mA \cdot cm^{-2}$) at an applied potential of –100 millivolts (mV) when catalyzing the hydrogen evolution reaction (HER) in water electrolysis.

20 Claims, 9 Drawing Sheets

(56) References Cited

U.S. PATENT DOCUMENTS

| | | | |
|---|---|---|---|
| 2021/0095384 A1* | 4/2021 | Aziz | C25B 11/054 |
| 2023/0132777 A1* | 5/2023 | Lee | B22F 1/054 |
| | | | 204/292 |
| 2024/0218539 A1* | 7/2024 | Siddiqui | C25B 11/037 |
| 2025/0149262 A1* | 5/2025 | Shah | H01G 11/24 |

FOREIGN PATENT DOCUMENTS

| | | |
|---|---|---|
| CN | 114262913 B | 8/2023 |
| CN | 117747857 A | 3/2024 |

OTHER PUBLICATIONS

Mengying Le, et al., "Construction of Co,N-coordinated carbon dots for efficient oxygen reduction reaction", Molecules vol. 27, Issue 15, Aug. 7, 2022, p. 1-12.

* cited by examiner

NANOCOMPOSITE CATALYST FOR WATER SPLITTING

CROSS REFERENCE TO RELATED APPLICATIONS

The present disclosure claims the benefit of Saudi Patent No. 1020253259, filed May 12, 2025, with the Saudi Authority for Intellectual Property Office, which is incorporated herein by reference in its entirety.

BACKGROUND

Technical Field

The present disclosure is directed to a nanocomposite catalyst, and more particularly relates to a nanocomposite catalyst including metal-organic framework (MOF), carbon quantum dots (CQDs), and carbon nanosheets (CNs) for use in water electrolysis.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The pursuit of sustainable energy sources has become imperative due to the numerous disadvantages of fossil fuels, such as environmental pollution, non-renewability, and the hazardous nature of their extraction and use. Amidst this backdrop, hydrogen emerges as a promising alternative, offering the highest energy content among common fuels and unparalleled abundance. Its production, particularly through the electrolysis of water, represents an effective way to harness and store renewable energy without leaving a carbon footprint. This process, however, faces challenges in terms of efficiency and cost.

State-of-the-art technologies for water electrolysis rely heavily on noble metal-based electrocatalysts. These materials, while effective, are prohibitively expensive and scarce. The use of different catalysts for each reaction side further escalates costs, underscoring the need for cost-effective, bifunctional catalysts made from abundant elements [See: Tang, C., et al., *Angew Chem Int*, 2015, 3, 54, 32, 9351-5]. Recent studies have made strides in developing high-activity catalysts that reduce the energy input for water splitting. Still, there remains a pressing need to further lower the cost and maximize efficiency. One strategy to reduce reliance on costly catalytic metals is to use them in conjunction with supporting materials, which increases the electrode's active surface area and reduces the quantity of metal needed. Carbon-based supports, such as carbon nanofibers [See: Steigerwalt, E. et al., *J Phys Chem B*, 2001, 105, 34], carbon nanotubes [See: Wildgoose, G., et al., *Small*, 2006, 2, 2, 182-93], graphene oxide [See: Jahan, M. et al., *Adv Funct Mater*, 2013, 23, 43], and carbon quantum dots (CQDs), have emerged as promising materials in this regard [See: Tang, D. et al, *ACS Appl Mater Interfaces*, 2014, 28, 6, 10, 7918-25; and Li, Y., et al. *Sensors and Actuators B: Chemical*, Volume 206, 2015, Pages 735-743]. CQDs, in particular, are notable for their high porosity, cost-effective synthesis processes, and unique electrical properties, distinguishing them from other carbon nanomaterials [See: Wang, Y. et al., *J. Mater. Chem. C,* 2014, 2, 6921-6939]. Metal-organic frameworks (MOFs), characterized by their porosity and crystalline structure, have been used to create metal/carbon composites for catalysis. Despite their potential, few have been applied to overall water splitting because they still lag behind noble-metal-based catalysts in efficiency and face stability issues due to their high chemical activity [See: Yan, L. et al., *Adv. Funct. Mater.,* 2017, 27, 40].

Although a few catalysts have been developed in the past, most of these suffer from drawbacks such as limited efficiency, insufficient stability, and scalability issues. Accordingly, it is one object of the present disclosure to develop a bifunctional nanocomposite catalyst for hydrogen production by water electrolysis, that surpasses benchmarks set by integrated Pt/C and $RuO_2$ catalysts in overall water-splitting efficiency, and overcomes the limitations of existing methods.

SUMMARY

In an exemplary embodiment, a nanocomposite catalyst for use as an electrode in water electrolysis is described. The nanocomposite catalyst includes a cobalt triazole (Co-Tri) metal-organic framework (MOF), carbon quantum dots (CQDs), carbon nanosheets (CNs), and an ionically conductive polymer binder. The mass ratio of the cobalt triazole metal organic framework to the carbon quantum dots is in a range from 1:2 to 1:4. The mass ratio of the cobalt triazole metal organic framework to the carbon nanosheets is in a range from 1:4 to 1:6. Further, the nanocomposite catalyst has a current density less than or equal to ($\leq$) $-5$ milliampere per centimeter square ($mA \cdot cm^{-2}$) at an applied potential of $-100$ millivolts (mV) when catalyzing the hydrogen evolution reaction in water electrolysis.

In some embodiments, the mass ratio of the cobalt triazole metal organic framework to the carbon quantum dots is in a range from 1:2.5 to 1:3.5.

In some embodiments, the mass ratio of the cobalt triazole metal organic framework to the carbon quantum dots is 1:3.

In some embodiments, the mass ratio of the cobalt triazole metal organic framework to the carbon nanosheets is in a range from 1:4.5 to 1:5.5.

In some embodiments, the mass ratio of the cobalt triazole metal organic framework to the carbon nanosheets is 1:5.

In some embodiments, the nanocomposite catalyst has a current density of less than or equal to $-7.5$ $mA \cdot cm^{-2}$ at an applied potential of $-100$ mV when catalyzing the hydrogen evolution reaction (HER) in water electrolysis.

In some embodiments, the nanocomposite catalyst has a current density of less than or equal to $-10$ $mA \cdot cm^{-2}$ at an applied potential of $-100$ mV when catalyzing the hydrogen evolution reaction in water electrolysis.

In some embodiments, the nanocomposite catalyst has a current density of less than or equal to $-12.5$ $mA \cdot cm^{-2}$ at an applied potential of $-200$ mV when catalyzing the hydrogen evolution reaction in water electrolysis.

In some embodiments, the nanocomposite catalyst has a current density of less than or equal to $-17.5$ $mA \cdot cm^{-2}$ at an applied potential of $-300$ mV when catalyzing the hydrogen evolution reaction in water electrolysis.

In some embodiments, the nanocomposite catalyst has a current density of greater than or equal to 5 $mA \cdot cm^{-2}$ at an applied potential of 1600 mV when catalyzing the oxygen evolution reaction (OER) in water electrolysis.

In some embodiments, the nanocomposite catalyst has a current density of greater than or equal 7.5 mA·cm$^{-2}$ at 1600 mV when catalyzing the oxygen evolution reaction in water electrolysis.

In some embodiments, the nanocomposite catalyst has a current density of greater than or equal to 10 mA·cm$^{-2}$ at 1600 mV when catalyzing the oxygen evolution reaction in water electrolysis.

In some embodiments, the nanocomposite catalyst has a current density of greater than or equal to 60 mA·cm$^{-2}$ at an applied potential of 1800 mV when catalyzing the oxygen evolution reaction in water electrolysis.

In some embodiments, the nanocomposite catalyst has a morphology including cobalt triazole metal organic framework particles and carbon quantum dots uniformly dispersed in a matrix of carbon nanosheets, and wherein the cobalt triazole metal organic framework particles have an average longest dimension in a range from 1 micrometer (μm) to 30 μm.

In some embodiments, the nanocomposite catalyst has a percent (%) change in current density of less than or equal to 15% when catalyzing the hydrogen evolution reaction in water electrolysis for 5 hours or more.

In some embodiments, the nanocomposite catalyst has a percent change in current density of less than or equal to 20% when catalyzing the hydrogen evolution reaction in water electrolysis for 10 hours or more.

In some embodiments, the nanocomposite catalyst has a percent change in current density of less than or equal to 22.5% when catalyzing the hydrogen evolution reaction in water electrolysis for 15 hours or more.

In some embodiments, the nanocomposite catalyst has a percent change in current density of less than or equal to 15% when catalyzing the oxygen evolution reaction in water electrolysis for 5 hours or more.

In some embodiments, the nanocomposite catalyst has a percent change in current density of less than or equal to 20% when catalyzing the oxygen evolution reaction in water electrolysis for 10 hours or more.

In some embodiments, the nanocomposite catalyst has a percent change in current density of less than or equal to 27.5% when catalyzing the oxygen evolution reaction in water electrolysis for 15 hours or more.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure is intended to include all hydration states of a given compound or formula unless otherwise noted or when heating a material.

As used herein, the term 'carbon nanostructure' or 'CNS' refers to a plurality of CNTs that can exist as a polymeric structure through, in particular, sharing common walls with one another and/or through being one or more of: interdigitated; branched; entangled; or, crosslinked. Thus, carbon nanostructures can be considered to have carbon nanotubes as a base monomer unit of their polymeric structure. In many cases, the constituent carbon nanotubes will be multiple walled carbon nanotubes (MWCNT).

As used herein, the term 'metal-organic framework (MOF)' refers to the crystalline materials composed of metal ions or metal clusters (nodes) that are linked by organic molecules (ligands), forming an extended three-dimensional network. The metal ions typically serve as coordination sites for the organic ligands, which act as linkers to create a porous, rigid structure. MOFs are characterized by their high surface area, tunable pore sizes, and structural flexibility, which can be tailored by selecting different metals and ligands.

As used herein, the term 'nanocomposite or nanoparticles or nanodots or nanosheet' refers to a multiphase material where one phase has dimensions in the nanometer range (typically 1-100 nm). These materials integrate a matrix, often a polymer, with nanoscale components such as nanoparticles, nanofibers, or other nanostructures, including carbon-based materials like carbon quantum dots and carbon nanosheets.

As used herein, the term 'water splitting' refers to the chemical reaction in which water is broken down into oxygen and hydrogen.

$$2H_2O \rightarrow 2H_2 + O_2$$

As used herein, the term 'current density' refers to a measure of the electric current flowing per unit area of a conductor or surface, typically expressed in amperes per square meter ($A/m^2$). It quantifies the distribution of electric charge flow in each direction across a specified area. Mathematically, current density is calculated by dividing the total current by the cross-sectional area through which the current flows.

As used herein, the term 'reversible hydrogen electrode (RHE)' refers to the standard reference electrode used in electrochemical measurements, defined by the reversible half-reaction of hydrogen ions and hydrogen gas at an electrode surface. The electrode typically comprises a platinum surface in contact with a solution containing H+ ions, where hydrogen gas is bubbled over the platinum.

Aspects of the present disclosure are directed toward a cost-effective nanocomposite catalyst, including cobalt triazole metal-organic framework (Co-Tri MOFs), carbon quantum dots (CQDs), and carbon nanosheets (CNs), to enhance overall water splitting efficiency for hydrogen and oxygen production. The nanocomposite catalyst outperforms current counterparts and approach platinum's efficiency, offering a pathway to sustainable and economically viable clean energy generation.

A nanocomposite catalyst for use as an electrode is described. The nanocomposite catalyst includes a cobalt triazole metal-organic framework (Co-Tri MOF), carbon quantum dots (CQDs), carbon nanosheets (CNs), and an ionically conductive polymer binder.

In some embodiments, the nanocomposite catalyst may include other frameworks, alone in combination with the Co-Tri MOF, such as Co-BTC, Co-MOF-74, Co-ZIF-67, Co-UiO-66, Co-MOF-5, Co-CAT-1, Co-TCPP, Co-MOF-74-$CO_2$, Co-bipyridine, Co-SBDC, Co-BDC, Co-FT-1, Co-HKUST-1, Co-IRMOF-3, Co-Fe-BDC, Co-ZIF-8, Co-PMOF, Co-Bipyridyl, Co-NU-1000, Co-IRMOF-10, and others. The mentioned frameworks may be paired with CQDs and CNs to form the nanocomposite catalysts, enhancing their utility in various applications.

In some embodiments, the nanocomposite catalyst morphology includes Co-Tri MOF particles combined with CQDs uniformly dispersed in a matrix of CNs. They may exist in various morphological shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, etc., and mixtures thereof.

In some embodiments, the cobalt triazole metal organic framework particles have an average longest dimension ranging from 0.25 μm to 60 μm, preferably 1 μm to 30 μm, with subranges including 2 to 5 μm, 3 to 5 μm, 4 to 5 μm, 4.5 to 5.5 μm, 5 to 6 μm, 5 to 7 μm, 5 to 7.5 μm, 5 to 8 μm, 5 to 10 μm, 5 to 10.5 μm, 5 to 11 μm, 5 to 11.5 μm, 10 to 12 μm, 10 to 13 μm, 10 to 15 μm, 10 to 16.6 μm, 10. To 18 μm, 10 to 19 μm, 10 to 20 μm, 15 to 20 μm, 15 to 22 μm, 15 to 25 μm, 15 to 27 μm, 15 to 28 μm, 15 to 29 μm, 20 to 25 μm, 20 to 28 μm, 20 to 29 μm, or 20 to 30 μm, more preferably 20 to 35 μm, yet more preferably 20 to 40 μm.

CQDs are nanometer-sized carbon particles and act as electronic conductors and may enhance the charge transfer between the cobalt triazole metal-organic framework and the electrode surface. Their unique size-dependent properties make them ideal for improving catalytic efficiency.

The CQDs of the present disclosure are prepared from citric acid and urea via a modified hydrothermal method. The weight ratio of the citric acid to the urea is from 6:1 to 1:6, preferably 5:1 to 1:5, preferably 4:1 to 1:4, preferably 3:1 to 1:3, preferably 1:3. Citric acid is a commonly used precursor in CQD synthesis due to its rich carbon content and ability to undergo polymerization and carbonization easily—thereby helping form the carbon core of the CQDs. In some embodiments, other acids, such as lactic acid, acetic acid, formic acid, tartaric acid, or a combination thereof, may also be used.

Urea typically serves as a nitrogen source, introducing nitrogen-containing functional groups (e.g., amine, amide) onto the CQDs—thereby enhancing the optical and electronic properties of the resulting quantum dots. At specific reaction conditions, the combination of citric acid and urea undergo carbonization, leading to the production of CQDs. The CQDs thus prepared combine the beneficial properties of both precursors—the strong carbon backbone from citric acid and the nitrogen doping from urea—resulting in the formation of CQDs with tailored size, shape, and surface functionalization.

Any suitable carbon source may be utilized to obtain the interconnected carbon nanosheets by pyrolysis in one step described herein. In some embodiments, the carbon source may be one or more mono-, di-, and/or tri-carboxylic acid or salt thereof such as, but not limited to, acetic acid, propionic acid, oxalic acid, succinic acid, malonic acid, glutaric acid, malic acid, fumaric acid, tartaric acid, citric acid, and ammonium, alkali or alkaline earth metal salts thereof such as but not limited to sodium ammonium acetate, sodium oxalate, potassium succinate, sodium citrate and the like. In some embodiments, other oxygen containing compounds may be utilized to obtain the carbon nanosheets such as, but not limited to sugars such as, but not limited to glucose, fructose, sucrose, and polysaccharides such as starch, cellulose, pectin, and the like. In a preferred embodiment, the carbon source is sodium citrate.

To obtain the carbon nanosheets, the carbon source, preferably sodium citrate, is heated under inert gas such as, but not limited to nitrogen, helium, and argon to a temperature in the range of 600-1200° C., preferably in the range of 700-1000° C., preferably in the range of 750-950° C., preferably about 800° C. for a time in the range of 0.5 to 4.0 hours, preferably in the range of 1 to 3 hours, preferably in the range of 1.5 to 2.5 hours, and preferably about 2 hours. The resulting carbon nanosheets may be washed with mineral acid at a concentration in the range of 2-15 wt. %, preferably 5-10 wt. %, preferably about 10 wt. %, and deionized water; and dried at a temperature in in the range of 60-120° C., preferably in the range of 70-100° C., preferably in the range of 85-95° C., preferably about 90° C.

In some embodiments, the nanocomposite catalyst includes ionically conductive polymer binders that provide mechanical integrity and ionic conductivity within composite materials. Suitable examples of the ionically conductive polymer binders may include, but is not limited to, polyvinylidene fluoride (PVDF), polytetrafluoroethylene (PTFE), Nafion, polyethylene oxide (PEO), carboxymethyl cellulose (CMC), styrene-butadiene rubber (SBR), polyacrylic acid (PAA), polyvinyl alcohol (PVA), sulfonated polyether ether ketone (SPEEK), polyimide-based polymers, polyaniline (PANI), and polypyrrole (PPy). In a preferred embodiment, the electrocatalyst combines cobalt triazole metal-organic framework particles and carbon quantum dots with an ionically conductive polymer binder.

The nanocomposite catalyst has an weight ratio of Co-Tri-MOF to the CQDs in the range of 1:1 to 1:5, preferably 1:2 to 1:4, preferably 1:2.5 to 1:3.5, and more preferably 1:3.

The nanocomposite catalyst has an weight ratio of Co-Tri-MOF to the CNs in the range of 1:4 to 1:6, preferably 1:4.5 to 1:5.5, and more preferably 1:5.

An electrocatalyst, including the nanocomposite catalyst, is described. The electrocatalyst includes particles of Co-Tri-MOF deposited onto a substrate. Suitable examples of substrates include, but are not limited to, graphite, graphene, carbon nanotubes, conductive polymers, copper, aluminum, nickel, iron, stainless steel, titanium, carbon paper, and their alloys. The substrate may be selected based on factors like electrical conductivity, mechanical strength, and chemical stability, providing optimal performance of the electrocatalyst in various electrochemical applications. In some embodiments, the substrate is a carbon substrate. In some embodiments, the carbon substrate may be modified to enhance its conductivity and mechanical stability, facilitating the integration of the composite materials for improved electrocatalytic performance. In a preferred embodiment, the carbon substrate is a carbon paper substrate.

In one embodiment, the particles of the Co-Tri-MOF may be deposited onto the substrate to form a coated substrate using several techniques. The techniques may include, but is not limited to, physical vapor deposition (PVD), chemical vapor deposition (CVD), spin coating, dip coating, electrophoretic deposition (EPD), Langmuir-Blodgett (LB) technique, drop casting, sol-gel process, layer-by-layer (LbL) assembly, inkjet printing, spray coating, or ultrasonic spray deposition. In a preferred embodiment, the particles of the Co-Tri-MOF are deposited onto the substrate using drop-casting technique.

The nanocomposite catalyst, with varying ratios of CQDs and CNs, was evaluated across different composite configurations. The evaluation focuses on current density values which is indicative of the performance of the nanocomposite catalyst during water electrolysis.

In an embodiment, the nanocomposite electrocatalyst can be used to produce hydrogen gas by a hydrogen evolution reaction. During water electrolysis, the nanocomposite electrocatalyst facilitates the electrochemical release of hydrogen gas through water electrolysis. This process involves passing an electric current through water, driving the reduction of protons at the cathode to generate hydrogen gas ($H_2$), while simultaneously oxidizing water molecules at the anode to release oxygen gas.

The nanocomposite electrocatalyst is contacted with an aqueous electrolyte solution comprising a hydroxide base or an alkaline electrolyte solution. In some embodiments, hydroxide bases may include but are not limited to NaOH, LiOH, $Ca(OH)_2$, $Ba(OH)_2$, $Sr(OH)_2$, $Mg(OH)_2$, $NH_4OH$, $Al(OH)_3$, $Zn(OH)_2$, $Fe(OH)_3$, $Cu(OH)_2$, AgOH, $NH_3$, RbOH, CsOH, LiOH, NaOH, KOH, $Ca(OH)_2$, $Mg(OH)_2$, $Mn(OH)_2$, $Pb(OH)_2$, $Co(OH)_2$, $Ni(OH)_2$, $Cu(OH)_2$, AgOH, TiOH, $Ga(OH)_3$, $In(OH)_3$, $Fe(OH)_2$, and $Cr(OH)_3$. In a preferred embodiment, the hydroxide base is KOH. In some embodiments, the concentration of KOH base may range from 0.5-5 M, 1.0-5 M, 1.5-5 M, 2.0-5 M, 2.5-5 M, 3.0-5 M, 3.5-5 M, 4.0-5 M, 4.5-5 M. In a preferred embodiment, the concentration of KOH is 1.0 M.

A potential of -400 to 0 mV vs. RHE, preferably -300 to 0 mV vs. RHE, preferably -250 to 0 mV vs. RHE, preferably -200 to 0 mV vs. RHE, preferably -150 to 0 mV vs. RHE, preferably -100 to 0 mV vs. RHE, is applied to the nanocomposite electrocatalyst and a counter electrode immersed in the aqueous electrolyte solution. In some embodiments, counter electrodes may include but are not limited to platinum, gold, graphite, carbon, nickel, copper, titanium, aluminum, stainless steel, iridium, tungsten, rhodium, palladium, iridium oxide, ruthenium oxide, conductive polymer, carbon nanotubes, carbon black, conductive glass, ITO (indium tin oxide), FTO (fluorine-doped tin oxide), glassy carbon, doped silicon, lead, bismuth, cobalt, zinc, copper oxide, iron, tin, zirconium, molybdenum, manganese, tungsten carbide, graphite oxide, copper sulfate, nickel oxide, carbon fiber, titanium oxide, and diamond-like carbon. In a preferred embodiment, the counter electrode is silver/silver chloride.

The nanocomposite catalyst has a current density of less than or equal to $-2.5$ mA·cm$^{-2}$, preferably less than or equal to $-5$ mA·cm$^{-2}$, preferably less than or equal to $-7.5$ mA·cm$^{-2}$, preferably less than or equal to $-10$ mA·cm$^{-2}$, at an applied potential of -100 mV when catalyzing the hydrogen evolution reaction in water electrolysis. In some embodiments, the nanocomposite catalyst has a current density of less than or equal to $-12.5$ mA·cm$^{-2}$ at an applied potential of -200 mV when catalyzing the hydrogen evolution reaction in water electrolysis. In some embodiments, the nanocomposite catalyst has a current density of less than or equal to $-17.5$ mA·cm$^{-2}$ at an applied potential of -300 mV when catalyzing the hydrogen evolution reaction in water electrolysis.

In some embodiments, the nanocomposite catalyst has a percentage change in current density of less than or equal to 10%, preferably 15% when catalyzing the hydrogen evolution reaction in water electrolysis for 5 hours or more. In some embodiments, the nanocomposite catalyst has a percent change in current density of less than or equal to 15%, preferably 20% when catalyzing the hydrogen evolution reaction in water electrolysis for 10 hours or more. In some embodiments, the nanocomposite catalyst has a percent change in current density of less than or equal to 17.5%, preferably 22.5% when catalyzing the hydrogen evolution reaction in water electrolysis for 15 hours or more.

The nanocomposite catalyst can also produce oxygen gas by an oxygen evolution reaction. The nanocomposite catalyst is contacted with an aqueous electrolyte solution comprising a hydroxide base. In some embodiments, hydroxide bases may include but are not limited to NaOH, LiOH, $Ca(OH)_2$, $Ba(OH)_2$, $Sr(OH)_2$, $Mg(OH)_2$, $NH_4OH$, $Al(OH)_3$, $Zn(OH)_2$, $Fe(OH)_3$, $Cu(OH)_2$, AgOH, $NH_3$, RbOH, CsOH, LiOH, NaOH, KOH, $Ca(OH)_2$, $Mg(OH)_2$, $Mn(OH)_2$, $Pb(OH)_2$, $Co(OH)_2$, $Ni(OH)_2$, $Cu(OH)_2$, AgOH, TiOH, $Ga(OH)_3$, $In(OH)_3$, $Fe(OH)_2$, and $Cr(OH)_3$. In a preferred embodiment, the hydroxide base is KOH. In some embodiments, the concentration of KOH base may range from 0.5-5 M, 1.0-5 M, 1.5-5 M, 2.0-5 M, 2.5-5 M, 3.0-5 M, 3.5-5 M, 4.0-5 M, 4.5-5 M. In a preferred embodiment, the concentration of KOH is 1.0 M.

A potential of 500 to 3500 mV vs. RHE, preferably 1000 to 2200 mV vs. RHE is applied to the nanocomposite catalyst and a counter electrode immersed in the aqueous electrolyte solution. In some embodiments, counter electrodes may include but are not limited to platinum, gold, graphite, carbon, nickel, copper, titanium, aluminum, stainless steel, iridium, tungsten, rhodium, palladium, iridium oxide, ruthenium oxide, conductive polymer, carbon nanotubes, carbon black, conductive glass, ITO (indium tin oxide), FTO (fluorine-doped tin oxide), glassy carbon, doped silicon, lead, bismuth, cobalt, zinc, copper oxide, iron, tin, zirconium, molybdenum, manganese, tungsten carbide, graphite oxide, copper sulfate, nickel oxide, carbon fiber, titanium oxide, and diamond-like carbon. In a preferred embodiment, the counter electrode is silver/silver chloride.

In some embodiments, the potential may range from 500 to 3500 mV vs. RHE, preferably 1000 to 2200 mV vs. RHE, 1000-1100 mV vs. RHE, 1100-1200 mV vs. RHE, 1200-1300 mV vs. RHE, 1300-1400 mV vs. RHE, 1400-1500 mV vs. RHE, 1500-1600 mV vs. RHE, 1600-1700 mV vs. RHE, 1700-1800 mV vs. RHE, 1800-1900 mV vs. RHE, 1900-2000 mV vs. RHE, 2000-2100 mV vs. RHE, 2100-2200 mV vs. RHE, 1000-1200 mV vs. RHE, 1100-1300 mV vs. RHE, 1200-1400 mV vs. RHE, 1300-1500 mV vs. RHE, 1400-1600 mV vs. RHE, 1500-1700 mV vs. RHE, 1600-1800 mV vs. RHE, 1700-1900 mV vs. RHE to the nanocomposite electrocatalyst. In an embodiment, the nanocomposite catalyst has a current density of greater than or equal to 2.5 mA·cm$^{-2}$, preferably 5 mA·cm$^{-2}$, preferably greater than 7.5 mA·cm$^{-2}$, and more preferably greater than 10 mA·cm$^{-2}$ at an applied potential of 1600 mV when catalyzing the oxygen evolution reaction in water electrolysis. In some embodiments, the nanocomposite catalyst has a current density of greater than or equal to 50 mA·cm$^{-2}$, preferably 60 mA·cm$^{-2}$ at an applied potential of 1800 mV when catalyzing the oxygen evolution reaction in water electrolysis.

In some embodiments, the nanocomposite catalyst has a percentage change in current density of less than or equal to 10%, preferably 15% when catalyzing the oxygen evolution reaction in water electrolysis for 5 hours or more. In some embodiments, the nanocomposite catalyst has a percent change in current density of less than or equal to 15%, preferably 20% when catalyzing the oxygen evolution reaction in water electrolysis for 10 hours or more. In some embodiments, the nanocomposite catalyst has a percent change in current density of less than or equal to 22.5%, preferably 27.5% when catalyzing the oxygen evolution reaction in water electrolysis for 15 hours or more.

The nanocomposite catalyst of the present disclosure may be used in water-splitting reactions. In some embodiments, the nanocomposite catalyst may also be used in the field of batteries, fuel cells, photochemical cells, water splitting cells, electronics, water purification, hydrogen sensors, semiconductors (such as field-effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis.

EXAMPLES

The following examples demonstrate a nanocomposite catalyst for use as an electrode in water electrolysis. The examples are provided solely for illustration and are not to be construed as limitations of the present disclosure, as many variations thereof are possible without departing from the spirit and scope of the present disclosure.

Example 1: Synthesis of Carbon Quantum Dots (CQD)

According to the present disclosure, the preparation of CQDs was carried out using a modified hydrothermal method. A homogeneous solution was prepared by dissolving 2 grams (g) of citric acid, which is equivalent to 1 millimole (mmol) and 1.9 g urea, which is equivalent to 3 millimoles (mmol), in 50 milliliters (mL) of deionized (DI) water. The solution mixture was then stirred for 30 minutes (min) to lead to complete dissolution. The reacted mixture was then transferred into a Teflon-lined stainless-steel reactor with a 100 mL capacity and heated at a constant temperature of 160° C. for 4 hours to obtain a product. Further, the product was dried at 60° C.° using a rotary evaporator, followed by characterization to calculate size distribution and fluorescence properties.

Example 2: Synthesis of Carbon Nanostructures (CN)

The CN was synthesized using a chemical vapor deposition (CVD) method. Approximately 5 g of sodium citrate ($Na_3C_6H_5O_7$) was placed in an alumina crucible and exposed to nitrogen gas flow in a tube furnace. The temperature was then gradually increased to 800° C. at a rate of 3° C. per minute ($m^{-1}$) and held steady for 2 hours. The thorough control provided uniform formation of nanostructures. Afterward, the product underwent a thorough washing process using 10% hydrochloric acid (HCL) and deionized water to remove impurities. The CN was then dried at 90° C. in a vacuum oven, and subsequently characterized for structural and morphological properties.

Example 3: Synthesis of Cobalt Triazole (Co-Tri)

The Co-Tri synthesis followed a hydrothermal approach with slight modifications for improved yield. A solution including 3 g of cobalt(II) chloride ($CoCl_2$) and 2 g of 1,2,4-triazole dissolved in 20 mL of deionized water. The mixture solution was stirred continuously for 30 minutes to provide a uniform mix. The formed mixture was then transferred into a 100 mL Teflon-lined stainless-steel reactor and heated at 160° C. for 4 hours. After heating, the solution underwent a series of centrifugation and washing steps with deionized water to purify the product. The sediment was then dried at 60° C. in a vacuum oven and characterized for crystal structure and purity.

Example 4: Synthesis of Electrocatalyst

After synthesizing the three main materials, including Co-Tri, CNs, and CQDs, the materials were carefully combined in a solution composed of deionized water, ethanol, and nafion. The mixture was then stirred continuously for 30 minutes until uniform consistency was confirmed. Further, the whole mixture was stirred and followed by sonication for an additional 30 minutes to further homogenize the solution, providing optimal dispersion of the components.

Once the sonication process was complete, 200 microliters (l) of the now homogeneous solution was carefully drop-casted onto a carbon paper substrate. The final step involved testing the prepared substrate using a potentiostat, where the prepared substrate underwent various electrochemical tests to evaluate the properties and performance of catalysts for future applications in energy conversion and storage.

Figure 1:
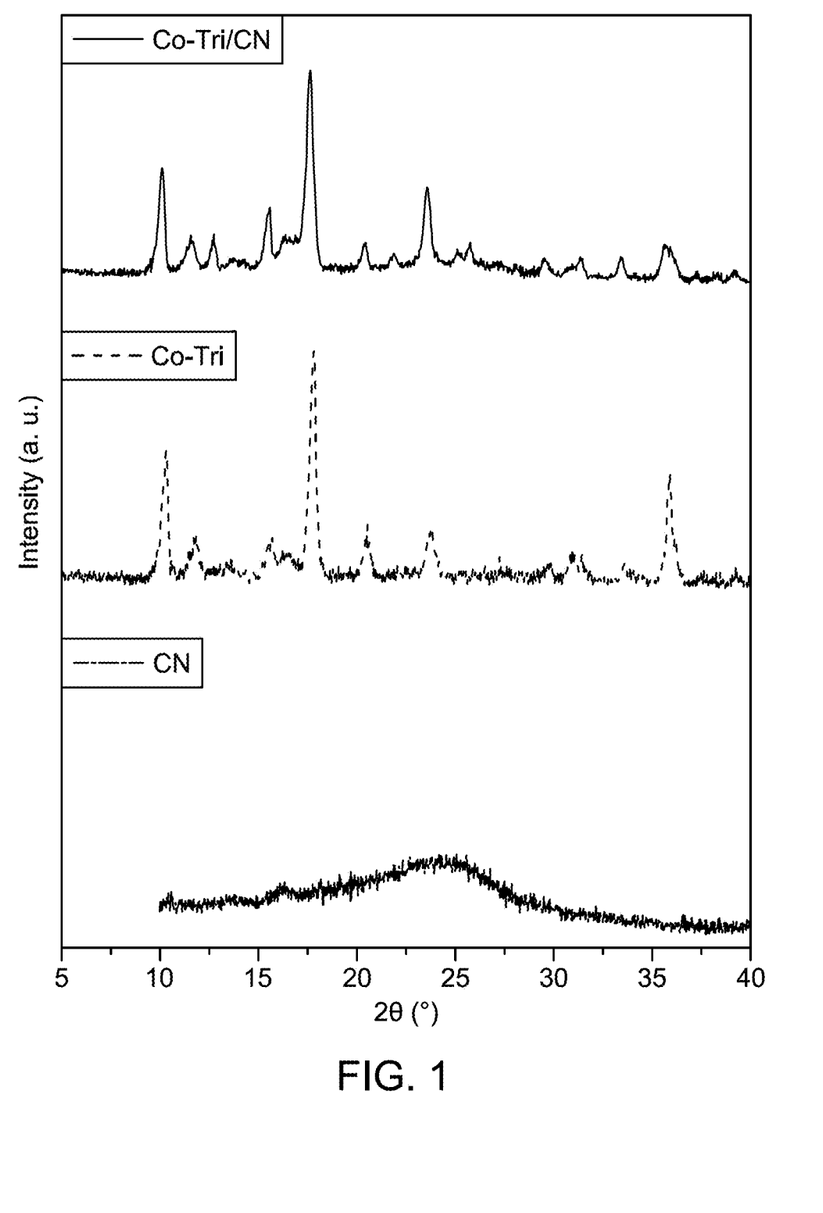
FIG. 1 shows X-ray diffraction (XRD) pattern of cobalt triazole (Co-Tri), according to certain embodiments.

The synthesized samples were analyzed using the powder X-ray diffraction (XRD). The XRD pattern of the Co-Tri complex, shown in FIG. 1. The characteristic peaks revealed 2θ values of 11.2°, 17.8° and 36.8°. The corresponding peaks were indexed to the specific crystalline planes of the Co-Tri complex, which align with the standard reference data for such coordination compounds. The peaks exhibited a sharp and well-defined profile, suggesting a high degree of crystallinity in the Co-Tri complex. The peak at 17.8° was particularly prominent, indicating a preferred orientation in the crystal structure, which was a common feature in well-synthesized coordination compounds. The analyses were evaluated using the Scherrer equation, and the crystallite size calculated from the width of the 17.8°, peak suggested a particle size in the nanometer (nm) range, highlighting the successful synthesis of nanostructured Co-Tri. The absence of any additional or unaccounted peaks suggests a high purity of the sample, indicating that no impurities or by-products were present. The background noise level was minimal, pointing towards a clean synthesis process and good sample preparation. The high purity and crystallinity were beneficial for the potential application of Co-Tri in catalysis and material science, where the molecular and crystal structure influences the material's properties and reactivity. The synergistic combination of Co-Tri and carbon nanosheets was further evidenced by the absence of any new peaks or alterations in the peak positions, indicating that no major chemical transformations occurred during the composite formation. This observation suggested a physical interaction rather than a chemical alteration of the Co-Tri or the CNs. Furthermore, the clear distinction between the carbon peak and the Co-Tri peaks in the XRD pattern was demonstrates the composite's dual nature, lending applicability to applications requiring both the conductive properties of carbon nanosheets and the catalytic or functional properties of Co-Tri.

Figure 2A:
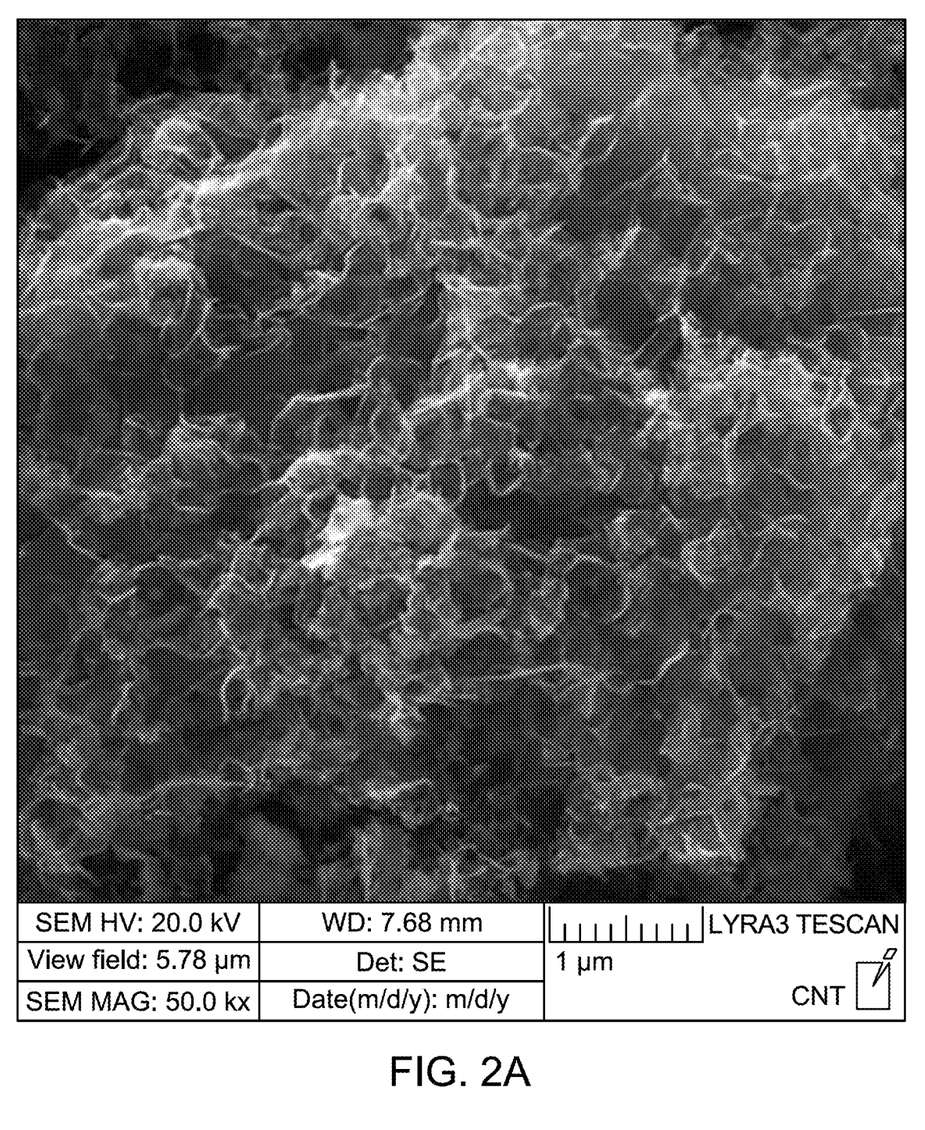
FIG. 2A shows a scanning electron microscopy (SEM) image for carbon nanosheets (CNs), according to certain embodiments.
Figure 2B:
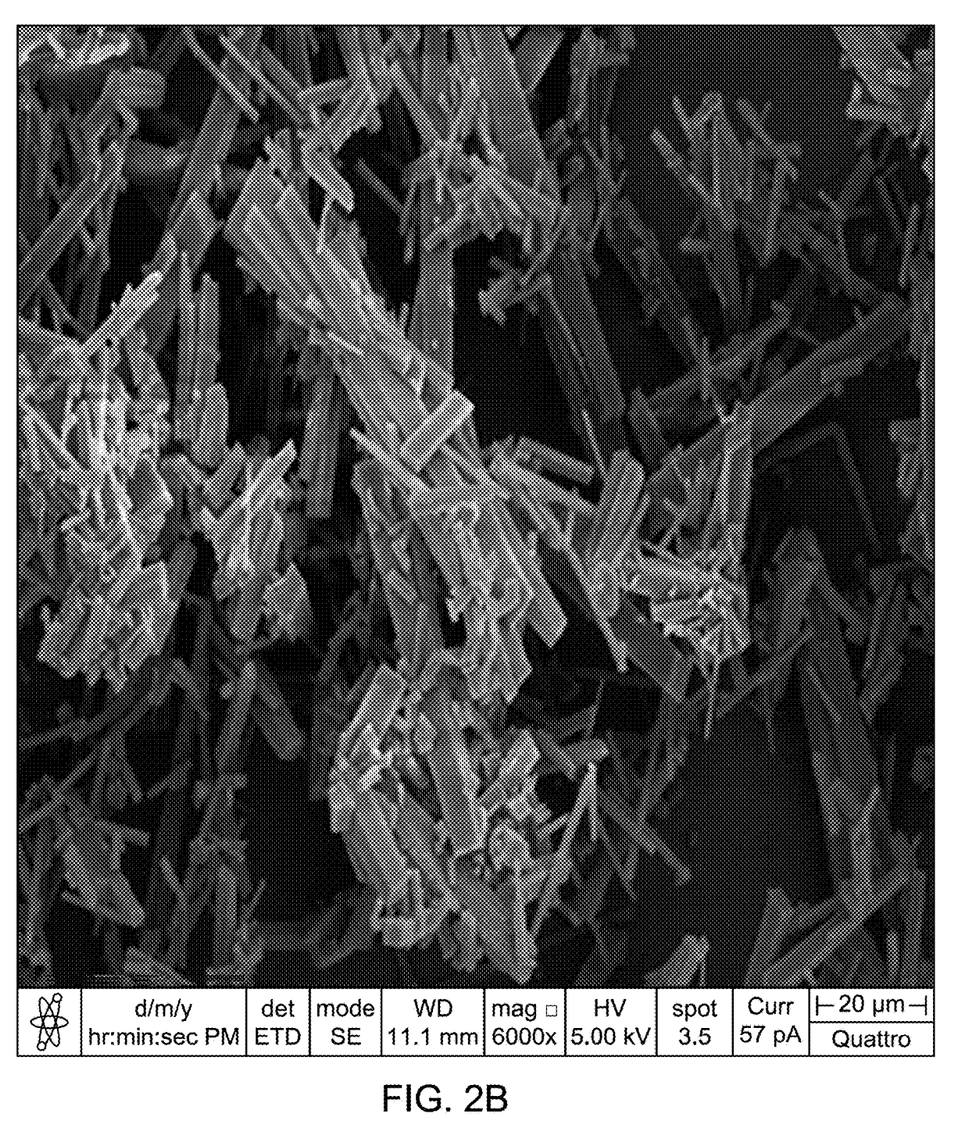
FIG. 2B shows a SEM image of cobalt triazole metal-organic framework (Co-Tri-MOF), according to certain embodiments.
Figure 2C:
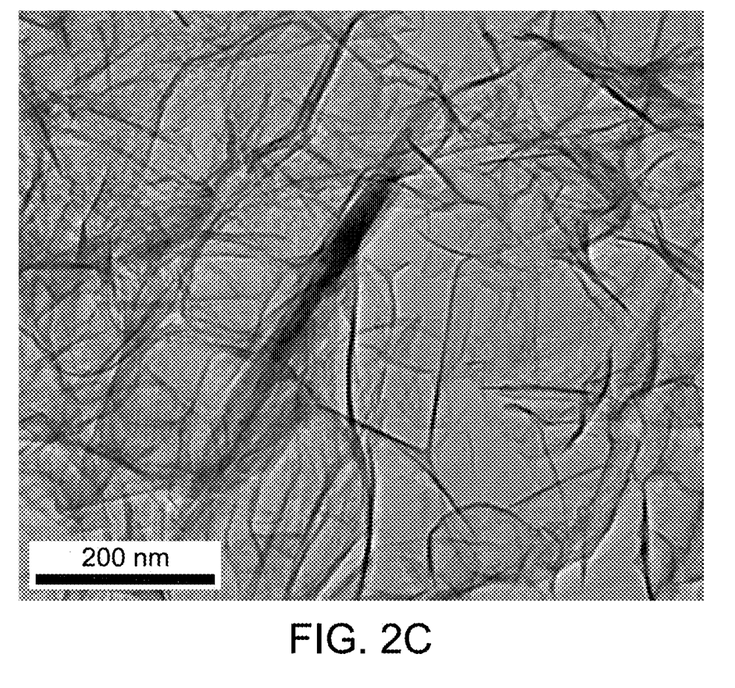
FIGS. 2C and 2D show transmission electron microscopy (TEM) images of Co-Tri/CN/CQD at different resolutions, according to certain embodiments.
Figure 2D:
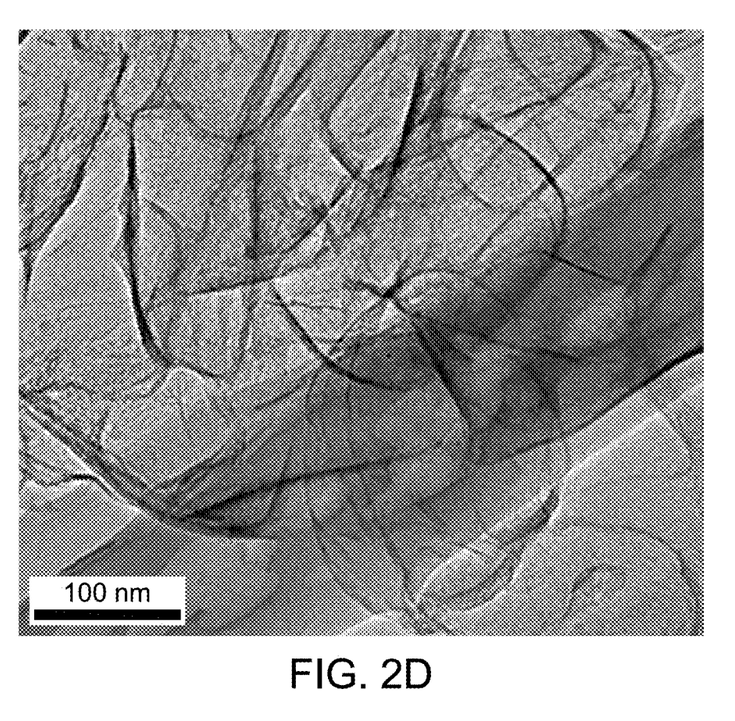

Further, the surface topography of the Co-Tri MOF composite, which incorporates CN and CQDs, was extensively examined using scanning electron microscopy (SEM), as shown in FIGS. 2A-2B. The SEM images revealed a rough and homogeneous surface texture, characteristic of the composite material. Notable morphological features of the Co-Tri MOF particles, intimately associated with CN and CQDs, were clearly identifiable. Surface characteristics impacted the catalytic properties of the composite. In terms of particle size and distribution, SEM provided detailed insights. The Co-Tri MOF particles and CQDs were evenly dispersed across the CNs. Such uniform dispersion provided a large and effective surface area for catalytic reactions. The morphological analysis confirmed a consistent particle size distribution, expected to contribute to the efficiency and stability of the catalyst in various applications. The uniformity in composition provided consistent catalytic activity across the material. The SEM analyses provided a comprehensive understanding of the physical and chemical structure of the Co-Tri/CN/CQD composite. The results indicated a well-integrated composite material with favorable surface and morphological features for catalytic applications, providing both the activity and stability of the catalyst. TEM images supported the SEM findings and showed the dispersed Co-Tri rods on the surface of the CN, as shown in FIGS. 2C-2D.

Figure 3A:
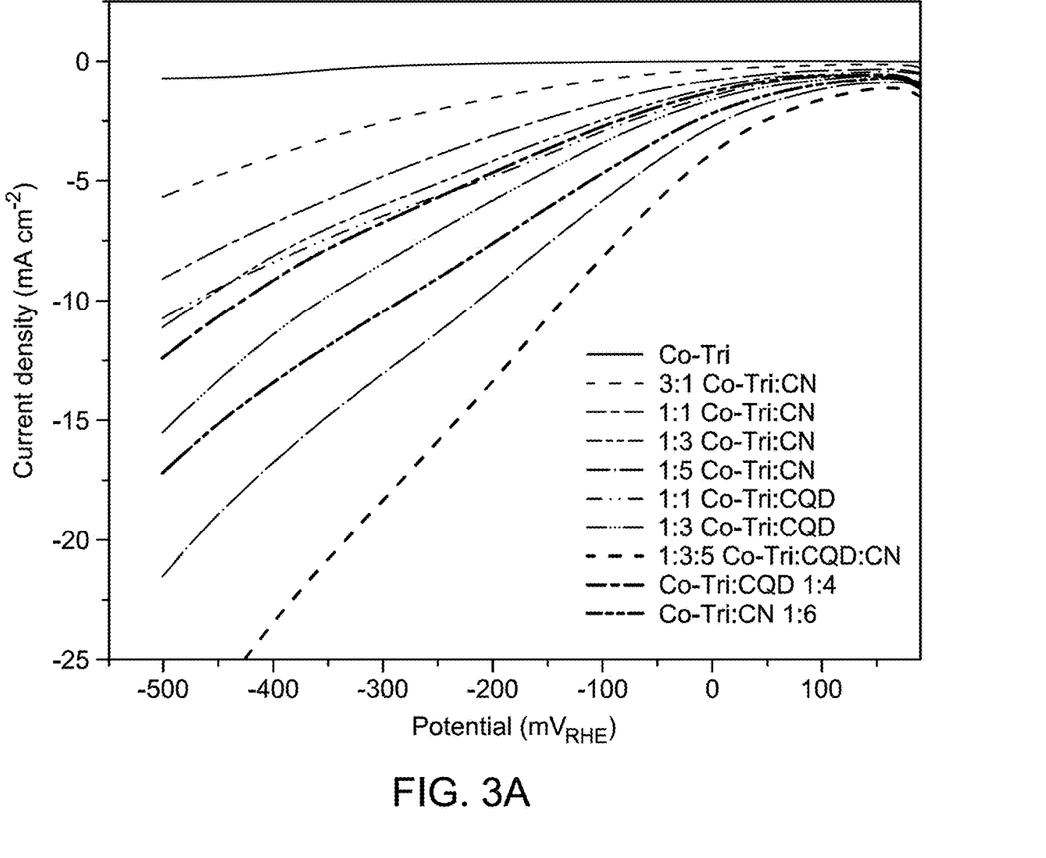
FIG. 3A is a linear sweep voltammetry (LSV) curve of Co-Tri/CNs/CQD electrocatalyst for hydrogen evolution reaction (HER), according to certain embodiments.
Figure 3B:
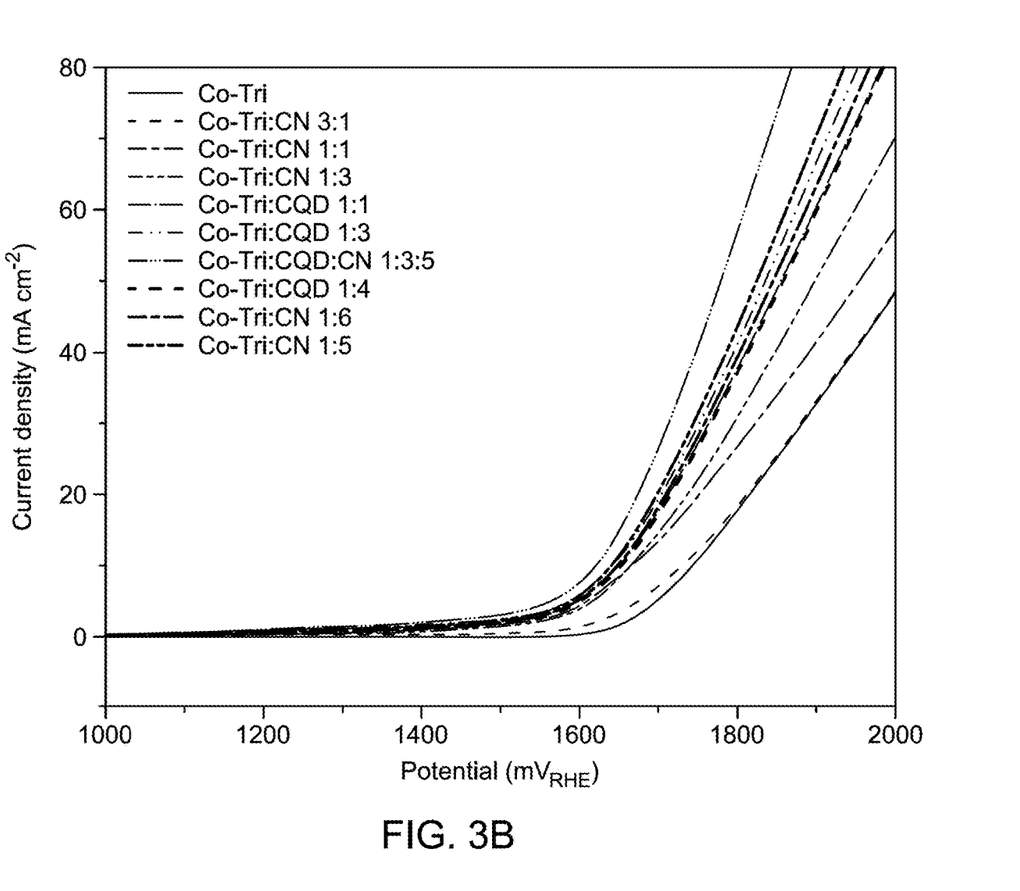
FIG. 3B is a LSV curve of the Co-Tri/CNs/CQD electrocatalyst for oxygen evolution reaction (OER), according to certain embodiments.
Figure 3C:
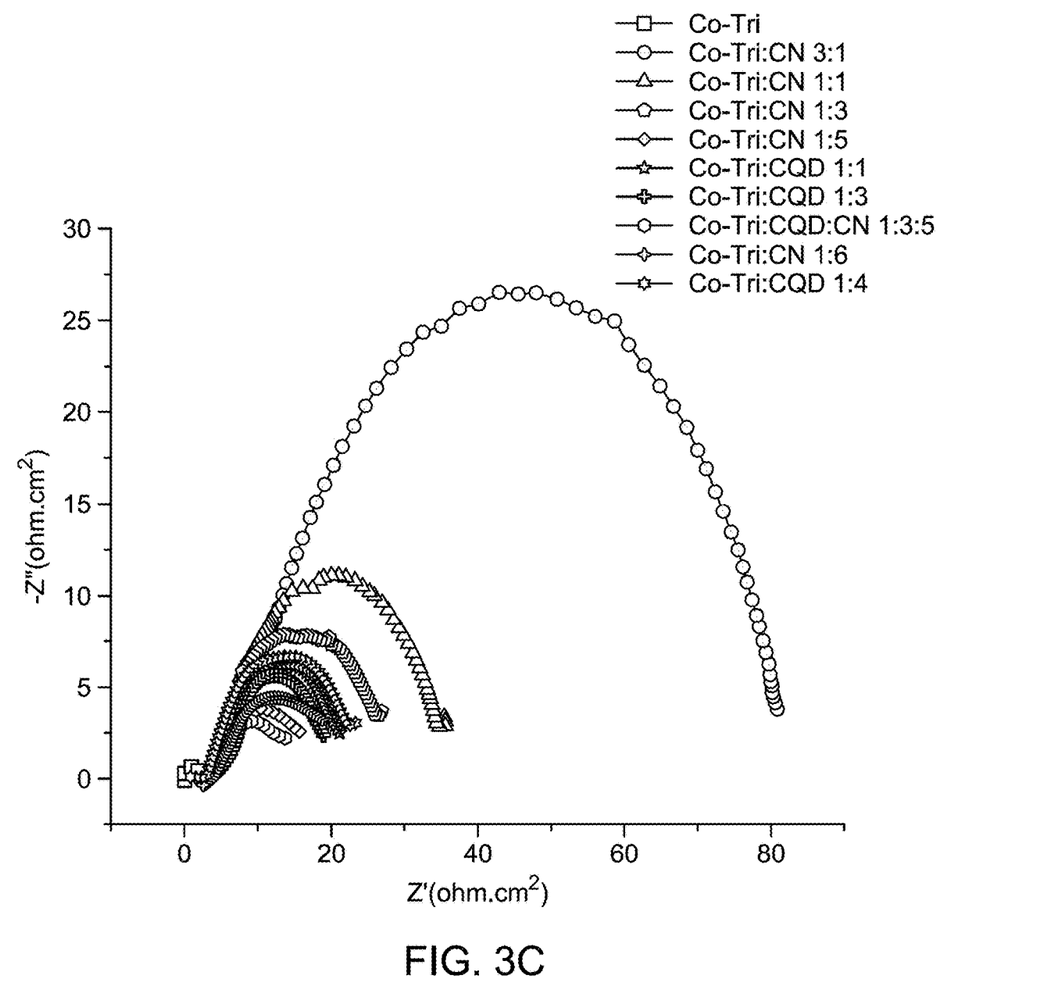
FIG. 3C shows electrochemical impedance spectroscopy (EIS) plot of the Co-Tri/CNs/CQD electrocatalyst for HER, according to certain embodiments.
Figure 3D:
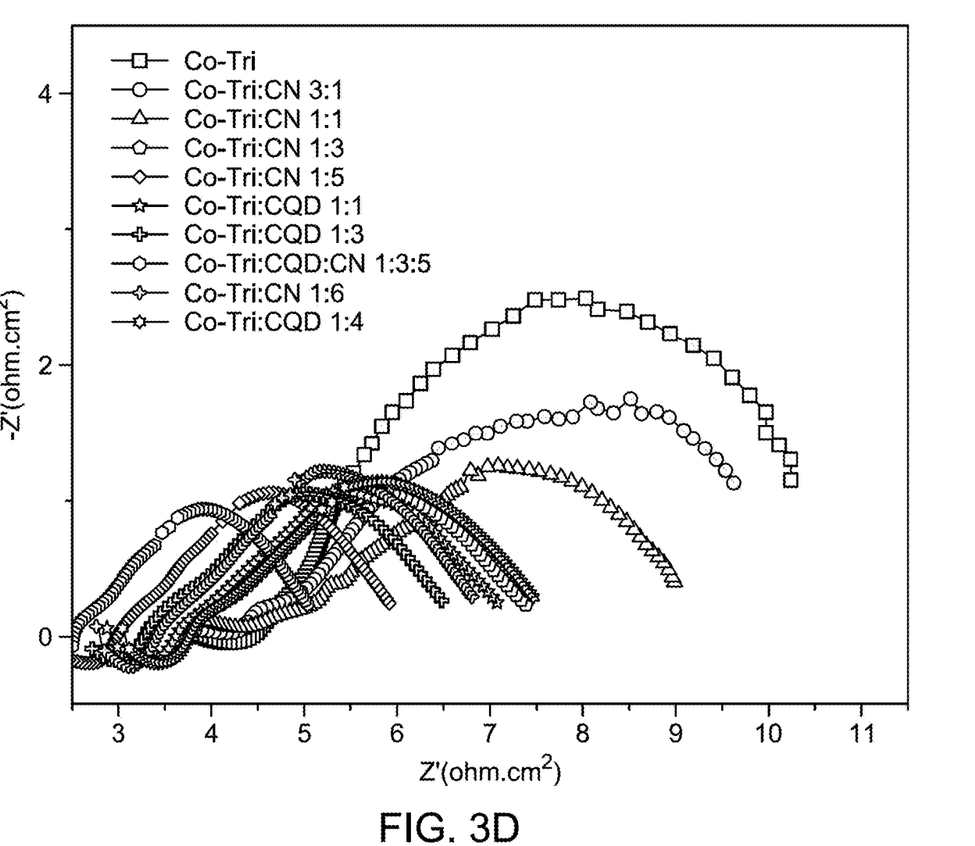
FIG. 3D shows EIS plot of the Co-Tri/CNs/CQD electrocatalyst for OER, according to certain embodiments.
Figure 4A:
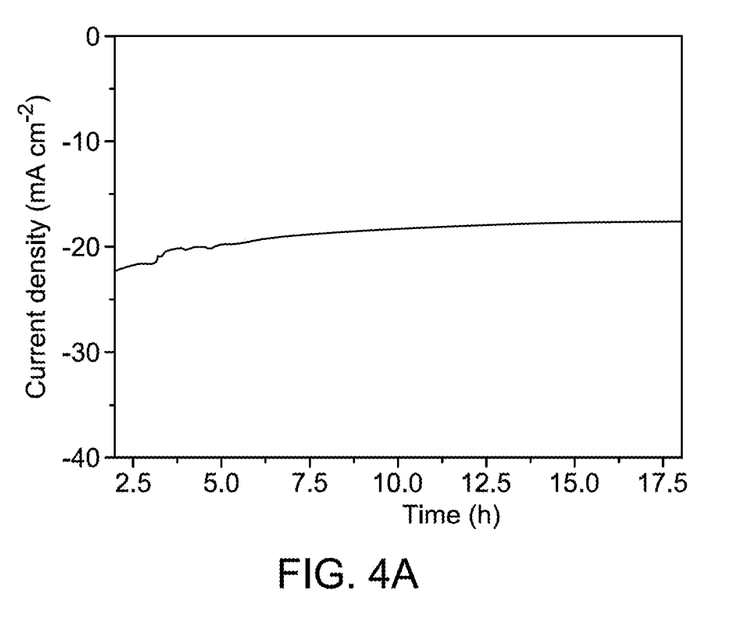
FIG. 4A is a stability evaluation curve of the Co-Tri/CNs/CQD electrocatalyst for HER, according to certain embodiments.
Figure 4B:
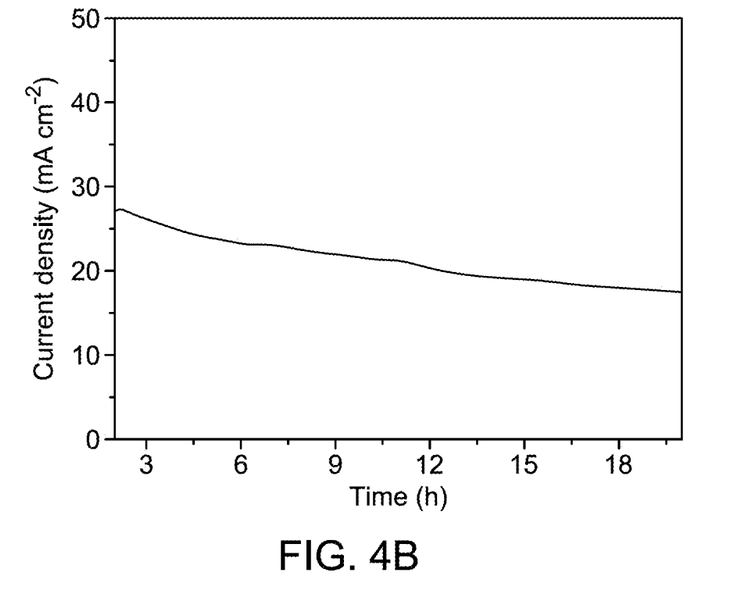
FIG. 4B is a stability evaluation curve of the Co-Tri/CNs/CQD electrocatalyst for OER, according to certain embodiments.

Further, the present disclosure included a suite of electrochemical tests, including linear sweep voltammetry (LSV) and electrochemical impedance spectroscopy (EIS) to investigate the performance of bare CN, Co-Tri and different composites between them with CQDs, as shown in in FIGS. 3A-3B. The results indicated that the optimized 1:3:5 ratio blend of Co-Tri to CQD to nanostructures exhibited a remarkable onset potential and Tafel slope for hydrogen evolution reaction (HER). The performance of the optimized 1:3:5 ratio blend of Co-Tri, CQD, and nanostructures surpassed that of Co-Tri alone and closely matched platinum catalysts. A suite of electrochemical tests, including linear sweep voltammetry (LSV) and electrochemical impedance spectroscopy (EIS), revealed an impressive onset potential and Tafel slope for oxygen evolution reaction (OER). The blend outperformed Co-Tri alone and the benchmark iridium oxide, as shown in FIGS. 3C-3D. Furthermore, electrode durability tests were conducted for HER and OER over 20 hours, where the catalyst exhibited excellent stability in both reactions, as shown in FIGS. 4A-4B.

In the present disclosure, a nanocomposite catalyst was developed including Co-Tri based MOFs combined with carbon nanostructures to address the challenges of sustainable hydrogen production. The nanocomposite catalyst of the present disclosure offers a promising solution to the growing energy demand and environmental concerns. The MOFs, recognized for their high surface area and tunability, paired with the conductive properties of carbon nanostructures, exhibited a synergistic effect that improved water-splitting efficiency. Experimental data obtained from the tests indicated effective performance, with a ratio 1:3:5 blend of Co-Tri, CQD, and carbon nanosheets outperforming other combinations in both the HER and OER. Further, the catalyst demonstrated efficiency comparable to platinum while offering a cost-effective solution, addressing barriers to hydrogen's adoption as a primary energy source. The present disclosure proposed a cost-effective catalyst that enhanced overall water splitting efficiency for hydrogen and oxygen production. The catalyst was estimated to outperform current counterparts and approach platinum's efficiency, offering a pathway to sustainable and economically viable clean energy generation.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A nanocomposite catalyst for use as an electrode in water electrolysis, comprising:
    a cobalt triazole metal organic framework;
    carbon quantum dots;
    carbon nanosheets; and
    an ionically conductive polymer binder,
    wherein the mass ratio of the cobalt triazole metal organic framework to the carbon quantum dots is in a range from 1:2 to 1:4,
    wherein the mass ratio of the cobalt triazole metal organic framework to the carbon nanosheets is in a range from 1:4 to 1:6, and
    wherein the nanocomposite catalyst has a current density of less than or equal to $-5$ mA·cm$^{-2}$ at an applied potential of $-100$ mV when catalyzing the hydrogen evolution reaction in water electrolysis.

2. The nanocomposite catalyst of claim 1, wherein the mass ratio of the cobalt triazole metal organic framework to the carbon quantum dots is in a range from 1:2.5 to 1:3.5.

3. The nanocomposite catalyst of claim 2, wherein the mass ratio of the cobalt triazole metal organic framework to the carbon quantum dots is 1:3.

4. The nanocomposite catalyst of claim 1, wherein the mass ratio of the cobalt triazole metal organic framework to the carbon nanosheets is in a range from 1:4.5 to 1:5.5.

5. The nanocomposite catalyst of claim 4, wherein the mass ratio of the cobalt triazole metal organic framework to the carbon nanosheets is 1:5.

6. The nanocomposite catalyst of claim 1, wherein the nanocomposite catalyst has a current density of less than or equal to $-7.5$ mA·cm$^{-2}$ at an applied potential of $-100$ mV when catalyzing the hydrogen evolution reaction in water electrolysis.

7. The nanocomposite catalyst of claim 6, wherein the nanocomposite catalyst has a current density of less than or equal to −10 mA·cm$^{-2}$ at an applied potential of −100 mV when catalyzing the hydrogen evolution reaction in water electrolysis.

8. The nanocomposite catalyst of claim 1, wherein the nanocomposite catalyst has a current density of less than or equal to −12.5 mA·cm$^{-2}$ at an applied potential of −200 mV when catalyzing the hydrogen evolution reaction in water electrolysis.

9. The nanocomposite catalyst of claim 1, wherein the nanocomposite catalyst has a current density of less than or equal to −17.5 mA·cm$^{-2}$ at an applied potential of −300 mV when catalyzing the hydrogen evolution reaction in water electrolysis.

10. The nanocomposite catalyst of claim 1, wherein the nanocomposite catalyst has a current density of greater than or equal to 5 mA·cm$^{-2}$ at an applied potential of 1600 mV when catalyzing the oxygen evolution reaction in water electrolysis.

11. The nanocomposite catalyst of claim 10, wherein the nanocomposite catalyst has a current density of greater than or equal to 7.5 mA·cm$^{-2}$ at 1600 mV when catalyzing the oxygen evolution reaction in water electrolysis.

12. The nanocomposite catalyst of claim 11, wherein the nanocomposite catalyst has a current density of greater than or equal to 10 mA·cm$^{-2}$ at 1600 mV when catalyzing the oxygen evolution reaction in water electrolysis.

13. The nanocomposite catalyst of claim 1, wherein the nanocomposite catalyst has a current density of greater than or equal to 60 mA·cm$^{-2}$ at an applied potential of 1800 mV when catalyzing the oxygen evolution reaction in water electrolysis.

14. The nanocomposite catalyst of claim 1, wherein the nanocomposite catalyst has a morphology comprising cobalt triazole metal organic framework particles and carbon quantum dots uniformly dispersed in a matrix of carbon nanosheets, and wherein the cobalt triazole metal organic framework particles have an average longest dimension in a range from 1 to 30 μm.

15. The nanocomposite catalyst of claim 1, wherein the nanocomposite catalyst has a percent change in current density of less than or equal to 15% when catalyzing the hydrogen evolution reaction in water electrolysis for 5 hours or more.

16. The nanocomposite catalyst of claim 1, wherein the nanocomposite catalyst has a percent change in current density of less than or equal to 20% when catalyzing the hydrogen evolution reaction in water electrolysis for 10 hours or more.

17. The nanocomposite catalyst of claim 1, wherein the nanocomposite catalyst has a percent change in current density of less than or equal to 22.5% when catalyzing the hydrogen evolution reaction in water electrolysis for 15 hours or more.

18. The nanocomposite catalyst of claim 1, wherein the nanocomposite catalyst has a percent change in current density of less than or equal to 15% when catalyzing the oxygen evolution reaction in water electrolysis for 5 hours or more.

19. The nanocomposite catalyst of claim 1, wherein the nanocomposite catalyst has a percent change in current density of less than or equal to 20% when catalyzing the oxygen evolution reaction in water electrolysis for 10 hours or more.

20. The nanocomposite catalyst of claim 1, wherein the nanocomposite catalyst has a percent change in current density of less than or equal to 27.5% when catalyzing the oxygen evolution reaction in water electrolysis for 15 hours or more.

* * * * *